United States Patent [19]

Baba et al.

[11] Patent Number: 4,948,196
[45] Date of Patent: Aug. 14, 1990

[54] PROTECTIVE BEAM FOR AUTOMOBILE SIDE DOORS

[75] Inventors: Yuko Baba; Tatsuo Ichikawa, both of Yokohama, Japan

[73] Assignee: Hashimoto Forming Industry Co., Ltd., Yokohama, Japan

[21] Appl. No.: 208,598

[22] Filed: Jun. 20, 1988

[30] Foreign Application Priority Data

Jun. 23, 1987 [JP] Japan .............................. 62-97253[U]

[51] Int. Cl.$^5$ ................................................ B60J 5/04
[52] U.S. Cl. ...................................... 296/188; 296/149
[58] Field of Search ..................... 296/188, 189, 146; 49/502; 52/796

[56] References Cited

U.S. PATENT DOCUMENTS 4,090,734 5/1978 Inami et al. ......................... 296/188
4,359,599 11/1982 Benner ................................ 228/165

FOREIGN PATENT DOCUMENTS 2459870 2/1981 France ................................... 52/796
50813 5/1981 Japan ................................... 296/188
122224 7/1983 Japan ................................... 296/146
185317 10/1983 Japan ................................... 296/146
157427 7/1986 Japan ................................... 296/188
2152883 8/1985 United Kingdom ................. 296/146

Primary Examiner—Margaret A. Focarino
Assistant Examiner—Joseph D. Pape
Attorney, Agent, or Firm—Stevens, Davis, Miller & Mosher

[57] ABSTRACT

An improved protective beam for automobile side door is disclosed, with a main body which includes a pair of elongate steel sheet members of corrugated cross-section. The steel sheet members are welded to each other along opposite groove portions such that a hollow space of box-like section is defined by each pair of opposite ridge portions of the steel sheet members. At least one steel sheet member has an end region as a mounting seat, where the beam is welded to the inner panel or pillar portion of the side door, and each ridge portion along the end region of the steel sheet member has a height which gradually decreases toward the end of the sheet member to form a generally flat mounting seat to be secured to a predetermined location of the side door.

7 Claims, 5 Drawing Sheets

FIG_1
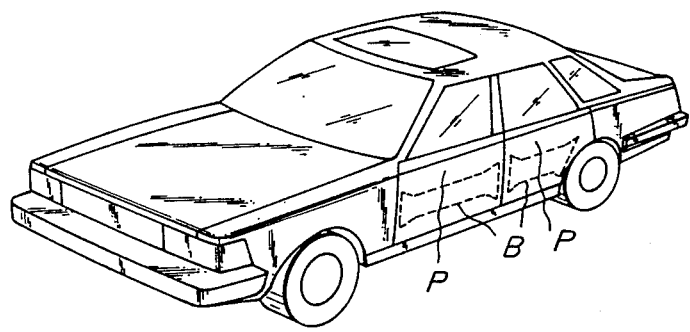

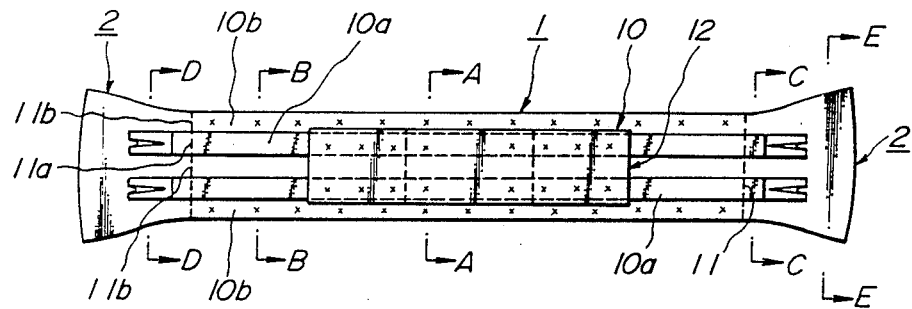
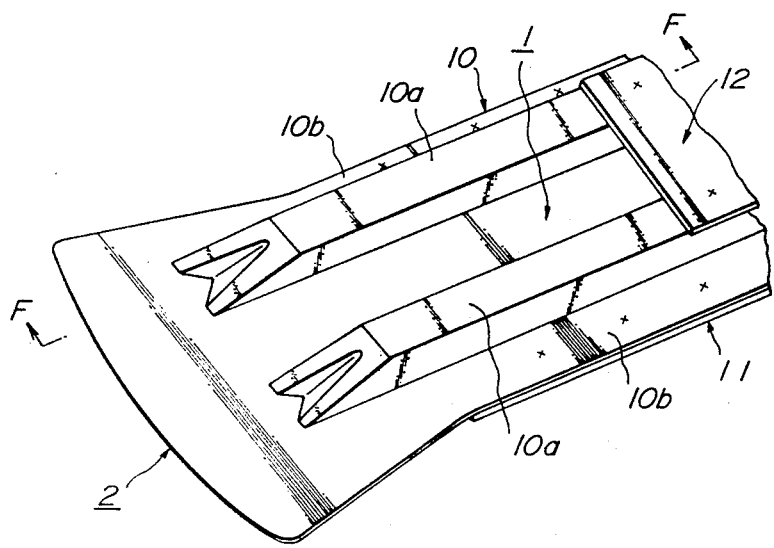

FIG_4
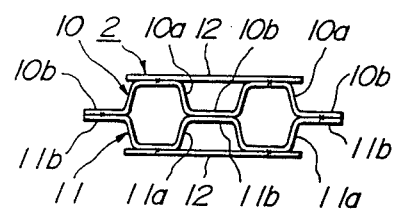
FIG_5
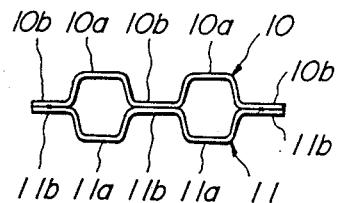
FIG_6
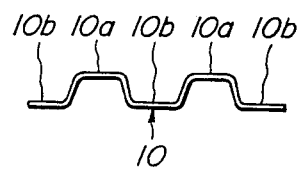
FIG_7
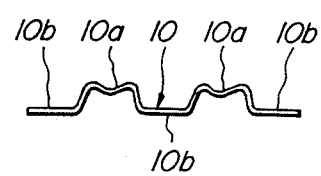
FIG_8
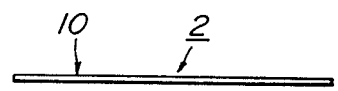
FIG_9
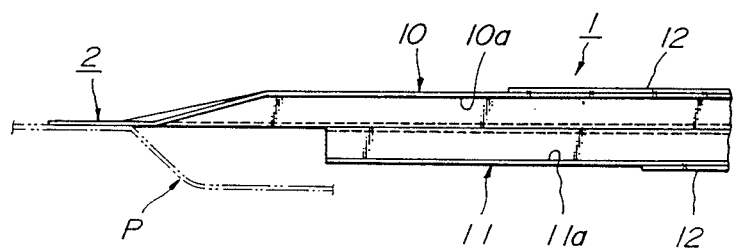

FIG_10
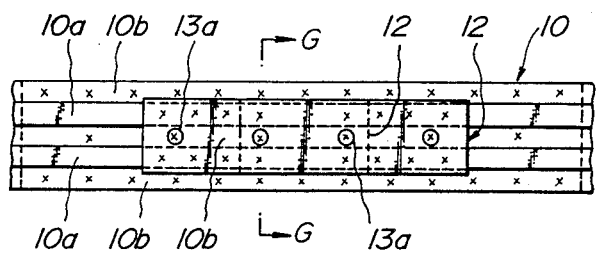
FIG_11
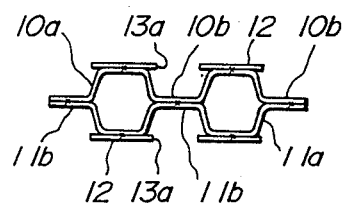
FIG_12
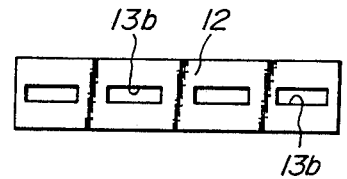
FIG_13
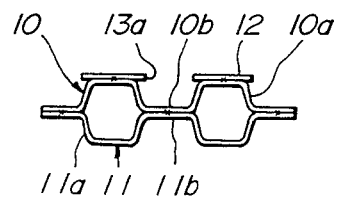
FIG_14
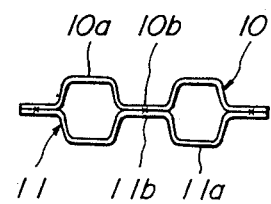

FIG_15
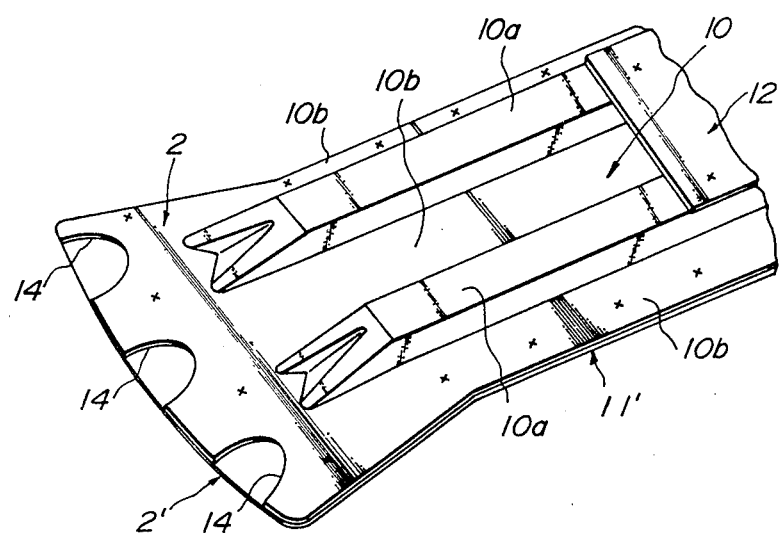

PROTECTIVE BEAM FOR AUTOMOBILE SIDE DOORS

BACKGROUND OF THE INVENTION

1. Field of the Invention:

The present invention relates to a protective beam for reinforcing automobile side doors; more particularly, it pertains to a protective beam which is adapted to be secured to an inner panel or pillar portion of the side door to provide higher mechanical strength, and thus improved safety for passengers.

2. Description of the Prior Art:

Such a protective beam is known e.g. from Japanese Patent Application Laid-open Publication No. 61-157427. The known protective beam includes an elongate main body formed of a steel sheet member of corrugated cross-section, with alternately arranged ridge and groove portions. Generally, in order to realize a sufficient mechanical strength of the protective beam, the steel sheet member is formed such that the height of a ridge portion is substantially the same as its width. The steel sheet member has longitudinal end regions each affording a shallow and generally flat mounting seat which conforms with the surface of the inner panel or pillar portion of the side door where the beam is to be stably and positively secured. In order to form the mounting seat with a desired configuration, each ridge portion of the steel sheet member along its end region is deformed to have a gradually decreased height.

The above-mentioned arrangement of the known protective beam suffers from an essential disadvantage that, due to a substantial height of the ridge portion in relation to its width, it is difficult to realize the desired configuration of the end region of the main body. Although a shallow and generally flat mounting seat may readily be formed when the ridge portion is made to have a lower profile or smaller height along the entire length thereof, this is possible only with the sacrifice of the mechanical strength whereby the protective beam cannot withstand an impact force placed on the side door e.g. upon crush or collision of the automobile.

SUMMARY OF THE INVENTION

It is therefore an object of the present invention to provide an improved protective beam for reinforcing automobile door panels, with a sufficient mechanical strength, and having a shallow and generally flat end regions which can be readily formed without lowering the mechanical strength of the beam.

According to the present invention, there is provided a protective beam for reinforcing an automobile side door, comprising a main body which includes a pair of elongate steel sheet members having a corrugated cross-section with alternately arranged ridge portions and groove portions, the steel sheet members being arranged such that the ridge and groove portions of one steel sheet member are opposed to the ridge and groove portions of another steel sheet member, respectively, the steel sheet members being fixedly secured to each other along the opposite groove portions such that a hollow space is defined by each pair of the opposite ridge portions of the steel sheet members, at least one of the steel sheet members having at least one longitudinal end region of a predetermined length, which terminates at one longitudinal end of the steel sheet member, each ridge portion of said at least one steel sheet member having a predetermined height along said end region, which gradually decreases toward said end to form a shallow and generally flat mounting seat to be secured to a predetermined location of the door panel.

The protective beam according to the present invention includes a main body which is composed of a pair of steel sheet members, so that each ridge portion may be formed to have a lower profile or height while providing a required mechanical strength of the beam. This makes it possible to readily decrease the height of the ridge portions along the longitudinal end region, thereby to form the shallow and generally flat mounting seat.

BRIEF DESCRIPTION OF THE DRAWINGS

FIG. 1 is a perspective view of an automobile, with side door panels to which the protective beam of the present invention may be applied;

FIG. 2 is a front view of the beam according to one embodiment of the present invention, as seen from inner panel side of the door;

FIG. 3 is a fragmentary perspective view in an enlarged scale, showing the longitudinal end region of the beam of FIG. 2, also as seen from inner panel side of the door;

FIGS. 4 to 8 are cross-sectional views of the beam taken along lines A—A, B—B, C—C, D—D and E—E in FIG. 2, respectively;

FIG. 9 is a cross-sectional view of the end region taken along line F—F in FIG. 3;

FIG. 10 is a partial plan view of the beam according to a modified embodiment of the present invention;

FIG. 11 is a cross-sectional view of the beam taken along line G—G in FIG. 10;

FIG. 12 is a plan view of a reinforcing plate with different opening shape;

FIGS. 13 and 14 are cross-sectional views of the beam according to another embodiment of the present invention; and FIG. 15 is a fragmentary perspective view showing the longitudinal end region of the beam according to still another embodiment of the present invention.

DETAILED EXPLANATION OF THE PREFERRED EMBODIMENTS

The present invention will now be more fully explained hereinafter, by referring to some preferred embodiments shown in the attached drawings.

There is shown in FIG. 1 an automobile with side doors, whose inner panels P are reinforced by protective beams B arranged between the inner and outer panels of the doors, to provide the safety for passengers against external impact force upon crush or collision of the automobile. The present invention pertains to an improvement in such protective beams.

A first embodiment of the present invention is shown in FIGS. 2 through 9, wherein the protective beam B includes an elongate main body 1 of an integral structure which is composed of a pair of steel sheet members 10, 11. Each steel sheet member 10, 11 is composed preferably of an elongate material with a substantially constant cross-section in the longitudinal direction, and may be formed of cold rolled high tension steel with a tensile strength of approximately 100–120 kg/mm$^2$, which is shaped by cold roll forming to have a corrugated cross-section with alternately arranged ridge portions 10a, 11a and groove portions 10b, 11b. Each ridge portion 10a, 11a has a predetermined constant height substantially along the entire length, which is preferably about one half of the width of its groove. The protective beam B further includes a pair of longitudinal end regions 2 each affording a shallow and generally flat mounting seat where the beam B is secured to the door panel P. These end regions 2 are formed by press operation to decrease the height of the ridge portions 10a, 11a of at least one steel sheet member 10, 11.

More particularly, according to the embodiment shown in FIGS. 2 to 9, the main body 1 of the beam B includes an inner steel sheet member 10 provided with both end regions 2, and a relatively short outer steel sheet member 11 which, in turn, is not provided with the end regions 2. That is, the outer steel sheet member 11 is shorter than the inner steel sheet member 10 by an amount which corresponds to approximately twice the length of the end region 2. The steel sheet members 10, 11 are so arranged relative to each other, that the ridge and groove portions 10a, 10b of the inner steel sheet member 10 are opposed to the ridge and groove portions 11a, 11b of the outer steel sheet member 11, respectively, and the opposite groove portions 10b, 11b of the inner and outer steel sheet members 10, 11 are in contact with each other. The inner and outer steel sheet members 10, 11 are then integrally connected into an integral structure, by welding at a plurality of predetermined locations indicated by X, which are arranged to form rows each extending along the groove portions 10b, 11b. A hollow space is defined by, and between, each pair of opposite ridge portions 10a, 11a, and has a box-like section with a total height which is substantially the same as its width. Such a geometry of the hollow spaces provides a sufficient mechanical strength of the beam B in use, against external impact bending force applied the automobile side door.

The corrugated cross-section of the main body 1 may tend to widen or expand in the width direction thereof, when impact force is placed on the side door panel P from outside upon crush or collision of the automobile, etc. This expansion would result in a decreased mechanical strength of the beam B, and is thus quite undesirable. In order to effectively prevent such expansion, reinforcing plates 12 may be secured integrally to the steel sheet members 10, 11 on both sides of the main body 1, bridging the neighbouring ridge portions 10a, 11a. As particularly shown in FIGS. 2 to 4, the reinforcing plates 12 may be welded to the steel sheet members 10, 11 along the ridge portions 10a, 11a. Such reinforcing plates 12 need be arranged only along the longitudinally center region of the main body 1.

The reinforcing plate 12 arranged on the inner side of the main body 1 serves to effectively withstand the tensile force to which the inner side of the main body 1 is subjected when external impact force is placed on the main body 1. Thus, the reinforcing plate 12 on the inner side not only prevents the above-mentioned expansion in the width direction of the main body 1, but also significantly improves the rigidity of the main body 1 against bending deformation thereof.

On the other hand, those regions of the main body 1 where the reinforcing plates 12 are not arranged, including the end regions 2, are of the cross-section as shown in FIGS. 5 to 8. By referring to FIGS. 3 and 9 also, it will be appreciated that the end region 2 of the main body 1 is composed of a relatively long inner steel sheet member 10. Furthermore, the height of the ridge portions 10a along the end region 2 of the inner steel sheet member 10 is gradually decreased to form a shallow and generally flat mounting seat of the beam B.

Formation of the mounting seat with such a configuration can readily be effected because of the lower profile of each ridge portion 10a of the inner steel sheet member 10, and permits the main body 1 of the protective beam to be fixedly secured to the inner panel P of the side door of an automobile either by spot-, arc-, or laser-welding, in a highly stable and reliable manner. Moreover, the main body 1 of the protective beam with the above-mentioned structure has hollow inner spaces with a box-like section, which are defined by pairs of oppositely arranged ridge portions 10a, 11a of the steel sheet members 10, 11, and which thus realize a satisfactory mechanical strength of the protective beam.

In the embodiment so far described, the main body 1 of the beam is formed of a full length inner steel sheet member 10 and a relatively short outer steel sheet member 11, and the end region as the mounting seat of the beam is provided only for the inner steel sheet member 10. It is also possible, however, to form the main body 1 by a relatively short inner steel sheet member 10 and a full length outer steel sheet member 11, or by inner and outer steel sheet members of substantially the same length.

When the main body 1 of the beam is provided with the above-mentioned reinforcing plate 12, a higher mechanical strength can be obtained by welding the groove portions 10b, 11b of the steel sheet members 10, 11 to each other at locations which correspond to a series of through openings 13a formed in the reinforcing plate 12 as shown in FIGS. 10 and 11. In this case, the openings 13a permit an access therethrough of welding electrodes to such locations. To facilitate the access and manipulation of the electrodes, as shown in FIG. 12, such openings in the reinforcing plate 12 may be in the form of elongate slits 13b.

When the main body 1 of the beam has a sufficient mechanical strength, and is rigid enough to adequately withstand undesirable expansion of the steel sheet members 10, 11 in the width direction, the reinforcing plate 12 may be arranged only on the inner side of the main body 1 (FIG. 13), or may be completely eliminated (FIG. 14).

An improvement in the mechanical strength of the protective beam B can also be achieved by still another embodiment of the present invention shown in FIG. 15, wherein the main body 1 of the beam is formed of inner and outer steel sheet members 10, 11' of substantially the same length. Longitudinal end regions 2, 2' as shallow and generally flat mounting seats are provided for both of the steel sheet members 10, 11' by gradually decreasing the height of the ridge portions of these members 10, 11'. The steel sheet members 10, 11' are welded to each other also in the end regions 2, 2' as shown by X, thereby to effectively prevent separation of the members 10, 11' from each other when the beam in use is acted upon by external impact force. The inner member 10 may be formed in its end region 2 with a plurality of cutouts 14 spaced from each other, to partly expose the surface of the outer steel sheet member 11 on its end region 2'. By this, when the beam is welded to the door inner panel P of the automobile, the end regions 2, 2' of both the inner and outer steel sheet members 10, 11 can be firmly secured to the panel P.

It will be appreciated that, in accordance with the present invention, the main body of the protective beam is formed of a pair of corrugated steel sheet members having relatively low profiled ridge portions. As a result, it is very easy to form the end regions with a desired shallow and generally flat configuration, by gradually reducing the height of the low profiled ridge portions along the end regions, and hence the protective beam can be secured to the door inner panel in a highly stable and reliable manner.

Furthermore, in accordance with the present invention, the corrugated steel sheet members are welded to each other so that hollow spaces of box-like section are defined by, and between, the opposite pair of the ridge portions of the two members. Each hollow space has a sufficient total height in relation to its width, and provides a necessary mechanical strength of the beam against severe impact force placed on the automobile side door, whereby the safety for passengers upon crush or collision can be significantly improved.

Moreover, the end region as the mounting seat of the beam, which is integral to the main body, not only provides a sufficient mechanical strength of the beam, but also makes it possible to realize less expensive beam which can be readily manufactured with an improved productivity, without requiring increase in the number of components or production steps.

While the present invention has been described with reference to certain preferred embodiments, by way of example, it is of course that various modifications and/or variations may be made without departing from the scope of the invention.

What is claimed is:

1. A protective beam for an automobile side door, comprising a main body which includes a pair of elongate steel sheet members of corrugated cross-section with alternately arranged ridge portions and groove portions, the ridge and groove portions of one steel sheet member being opposed to the ridge and groove portions of another steel sheet member, respectively, ridge portions of said one steel sheet member being oriented in opposite directions to extend from opposite, ridge portions of said another steel sheet member, the steel sheet members being integrally connected to each other along the opposite groove portions such that a hollow space is defined by each pair of the opposite ridge portions of the steel sheet members, said hollow space having a height which is substantially twice that of each of said ridge portions, at least one of the steel sheet members having at least one longitudinal end region of a predetermined length, said corrugated cross section of sheet members being substantially identical and uniform, except at said longitudinal end region; said opposite ridge portions of said pair of steel sheet members forming side edges of said protective beam; said longitudinal end region being of a onepiece construction with said at least one of the steel sheet members to terminate at one longitudinal end thereof, each ridge portion of said at least one steel sheet member having a predetermined height along said end region, said predetermined height (i) gradually decreasing toward said one longitudinal end to form a generally flat mounting seat to be secured to a predetermined location of the door and (ii) being smaller along its entire extent than a width of each ridge portion of said at least one steel sheet member, wherein said main body has a reinforcing plate which is secured to said steel sheet members such as to bridge said ridge portions.

2. The beam as claimed in claim 1, wherein at least one of said steel sheet members is composed of a cold rolled high tension steel.

3. The beam as claimed in claim 1, wherein said reinforcing plate has at least one opening, and opposite groove portions of said steel sheet members are welded to each other at a predetermined location which corresponds to said opening of said reinforcing plate.

4. The beam as claimed in claim 1, wherein said at least one longitudinal end region is provided for only one of said steel sheet members.

5. The beam as claimed in claim 4, wherein one of said steel sheet members is shorter than the other by an amount which corresponds to substantially twice said predetermined length of said longitudinal end region, and wherein a pair of said longitudinal end regions are provided for only one of said steel sheet members.

6. The beam as claimed in claim 1, wherein each ridge portion has a height which is approximately one-half of its width, and each hollow space has a height which is substantially the same as its width.

7. A protective beam for an automobile side door, comprising a main body which includes a pair of elongate steel sheet members of corrugated cross-section with alternately arranged ridge portions and groove portions, the ridge and groove portions of one steel sheet member being opposed to the ridge and groove portions of another steel sheet member, respectively, the steel sheet members being integrally connected to each other along the opposite groove portions such that a hollow space is defined by each pair of the opposite ridge portions of the steel sheet members, at least one of the steel sheet members having at least one longitudinal end region of a predetermined length, said longitudinal end region being of a one-piece construction with said at least one of the steel sheet members to terminate at one longitudinal end thereof, each ridge portion of said at least one steel sheet member having a predetermined height along said end region, said predetermined height (i) gradually decreasing toward said one longitudinal end to form a generally flat mounting seat to be secured to a predetermined location of the door and (ii) being smaller along its entire extent than a width of each ridge portion of said at least one steel sheet member, wherein said steel sheet members are of substantially the same length, one of said steel sheet members having at least one cutout in its longitudinal end region, said mounting seat including the surface of the other steel sheet member which is exposed by said cutout in said one steel sheet member.

* * * * *